United States Patent [19]
Barilli et al.

[11] 3,812,242
[45] May 21, 1974

[54] PROCESS FOR THE SIMULTANEOUS PRODUCTION OF SULPHUR DIOXIDE AND CONCENTRATED AQUEOUS SULPHURIC ACID

[75] Inventors: Filippo Barilli; Giorgio Cozza; Vittorio Bareggi, all of Milan, Italy

[73] Assignee: Societe Italiana Resine S.p.A., Milan, Italy

[22] Filed: Apr. 14, 1972

[21] Appl. No.: 244,248

Related U.S. Application Data

[63] Continuation of Ser. No. 28,936, April 15, 1970, abandoned.

[30] Foreign Application Priority Data
Apr. 19, 1969  Italy ................................. 15796/69

[52] U.S. Cl. ................. 423/530, 423/541, 423/542, 423/633
[51] Int. Cl. ..................... C01b 17/72, C01b 17/50
[58] Field of Search ........... 423/530, 541, 542, 615, 423/633

[56] References Cited
UNITED STATES PATENTS

| | | | |
|---|---|---|---|
| 3,265,464 | 8/1966 | Udd | 423/615 |
| 3,086,846 | 4/1963 | Clark | 423/530 |
| 3,195,981 | 7/1965 | Hansford et al. | 423/541 |
| 1,813,649 | 7/1931 | Weise | 423/633 |
| 2,174,185 | 9/1939 | Carter | 423/541 |
| 3,554,733 | 1/1971 | Colombo et al. | 423/633 X |
| 2,280,508 | 4/1942 | Bousquet et al. | 423/530 |

*Primary Examiner*—Oscar R. Vertiz
*Assistant Examiner*—Brian E. Hearn
*Attorney, Agent, or Firm*—Sughrue, Rothwell, Mion, Zinn & Macpeak

[57] ABSTRACT

Ferrous sulphate heptahydrate by-product is 40–60% dehydrated, then converted to the monohydrate by heating with decomposition gases from subsequent roasting with pyrites. $SO_3$ is then removed from the gases by washing with sulphuric acid of at least 75% concentraton.

4 Claims, No Drawings

PROCESS FOR THE SIMULTANEOUS PRODUCTION OF SULPHUR DIOXIDE AND CONCENTRATED AQUEOUS SULPHURIC ACID

CROSS-REFERENCE TO RELATED APPLICATION

This application is a Continuing application of our earlier co-pending application Ser. No. 28,936 filed Apr. 15, 1970, now abandoned and claims priority from Apr. 19, 1969 based on Italian Patent Application Serial No. 15,796.

The present invention relates to a process for the production of ferric oxide, sulphur dioxide and a concentrated aqueous solution of sulphuric acid from ferrous sulphate in its hydrated form.

In the production of titanium dioxide from ilmenite and sulphuric acid, as is well known, considerable quantities of a substance consisting essentially of the heptahydrate of ferrous sulphate are formed.

In view of the limited use of ferrous sulphate and of the fact that its direct disposal gives rise to gross pollution, it is necessary to convert it into substances that are free from effluent objections and preferably into useful products.

The ferrous sulphate heptahydrate is therefore usually converted by desiccation to the monohydrate form, which is then decomposed in ovens, along with large amounts of pyrites, to produce sulphur dioxide.

These methods, however, whereby ferric oxide, sulphuric acid and sulphur dioxide can be produced, have drawbacks that cannot be ignored: in particular, the sulphur dioxide produced is very impure, the heat consumption is very great and the pyrites residues are heavily contaminated with titanium dioxide in high concentrations.

It has now been discovered that the ferrous sulphate heptahydrate can be converted simply and economically into useful products by a process consisting essentially in treating the ferrous sulphate, from which some of the water of crystallisation has been removed, to convert it to monohydrate form, then decomposing this into ferric oxide, sulphur trioxide and sulphur dioxide. More specifically, the hot gases generated during that stage of the process in which the ferrous sulphate monohydrate is decomposed to form ferric oxide are used to produce the ferrous sulphate monohydrate itself.

Moreover, the decomposition stage takes place in the presence of small quantities of pyrites effected by very hot gas containing oxygen fed over the ferrous sulphate monohydrate.

It should be noted that the process here proposed produces a sulphur dioxide that is substantially free from the impurities invariably present in the processes used hitherto, especially those containing arsenic.

For example, the sulphur dioxide obtained by the process with which the invention is concerned can be used for the production of hydroxylamine sulphate in processes in which alkaline or ammonium nitrites are caused to react with sulphur dioxide.

In accordance with the invention, the ferrous sulphate heptahydrate is first relieved of 40 to 60% of its water of crystallisation.

To that end, the heptahydrate may for example be maintained at a temperature above 70°C, and preferably in the region of 100°C., in a suitable reaction vessel such as, for example, an evaporator with bottom heating long enough for 40% to 60%, and preferably about 50%, of its water of crystallisation to be removed by evaporation. The resultant product is transferred to a suitable container such as a drier, for example, in which it loses water of crystallisation and is converted to its monohydrate form. This is then put into an oven maintained at a temperature of approximately 800°C., where it is decomposed in the presence of small quantities of pyrites and superheated air to form ferric oxide, which is discharged, as well as sulphur dioxide, sulphur trioxide and water vapour.

The hot gases from the oven are passed to the drier, in which they supply the heat required to convert the material that has already been partially dehydrated into ferrous sulphate monohydrate.

From this drier, the exit temperature of which is preferably maintained at between 320° and 380°C. or, better still, between 340° and 350°C., the gases produced are recovered and are then partly absorbed in a washing tower.

The pyrites, which are converted into ferric oxide and sulphur dioxide and promote the decomposition of the ferrous sulphate monohydrate, are fed preferably in quantities such that the proportion of sulphur dioxide derived from conversion of the pyrites, in relation to the sulphur dioxide emerging from the washing tower, does not exceed 30% by volume, the remainder being derived from the decomposition of the ferrous sulphate monohydrate.

The gaseous mixture, which upon leaving the drier in which it has taken in the water vapour evolved during the formation of the ferrous sulphate monohydrate, in the conditions specified above, has a molar ratio of sulphur dioxide to sulphur trioxide in the region of 5:1 to 10:1, is passed into a washing tower.

At the base of this tower, an aqueous sulphuric acid solution is collected, part of which is discharged, while the remainder, after cooling, constitutes the liquid condensate used for absorbing the gases.

The aqueous solution of sulphuric acid is preferably percolated from the top of the tower in counterflow to the admitted gas in quantities such that the molar ratio of acid solution to admitted gas lies between 5:1 and 2:1 and preferably between 4:1 and 3:1.

The aqueous solution of sulphuric acid collected from the base of the tower is at a sulphuric acid concentration of not less than 75% by weight, while the gas issuing from the top of the tower is substantially free from sulphur trioxide.

The process here proposed is not only extremely simple, but has many advantages which make it economically attractive.

In fact, it makes possible the production, from waste products, of sulphur dioxide that can be usefully employed in other processes; it is of high thermal efficiency; it offers the possibility of recovering the sulphur trioxide formed as a concentrated aqueous solution of sulphuric acid; in fact, the percentages of sulphur trioxide and water vapour at the entry to the tower are such that it is possible to recover the whole of the sulphur trioxide in the form of an aqueous solution of sulphuric acid having a concentration of 75% or more.

The following example will serve to illustrate the present invention.

EXAMPLE

A by-product consisting substantially of $FeSO_4 \cdot 7H_2O$, from the production of titanium dioxide from ilmenite and sulphuric acid, was fed at the rate of 22 tons an hour to an evaporator heated from below, in which the temperature was maintained at 101°C., 5.2 tons of water being evaporated in an hour. The sludge obtained was passed to a drier, the exit temperature of which was maintained at 346°C. by the re-cycling of hot gases. The ferrous sulphate monohydrate so obtained was transferred at the rate of 12.8 tons an hour to an oven at a temperature of 800°C., to which approximately 1.8 tons an hour of pyrites was also supplied, along with superheated air obtained by burning fuel oil in the presence of excess air. The ferrous sulphate monohydrate and pyrites were decomposed to form ferric oxide, which was discharged at the rate of some 7.2 tons an hour, as well as sulphur dioxide, sulphur trioxide and water vapour.

These gases constituted the re-cycled gases fed at 28.2 tons an hour to the drier. The gas leaving the drier at the rate of about 32.2 tons an hour contained sulphur dioxide and sulphur trioxide to the extent of approximately 18% and 3.9% by weight respectively.

This gas was passed into a tower in counterflow to an aqueous solution of sulphuric acid percolating from the top.

As a result, about 2 tons an hour of an aqueous solution of sulphuric acid was collected from the base of the tower at a concentration of approximately 75%, part of which was re-cycled through the tower, the molar ratio between the acid solution and the gas admitted to the tower being adjusted to 3:1.

At the top of the tower, about 30 tons an hour was produced of a gas containing 12% by volume of sulphur dioxide and substantially free from arsenical compounds and sulphur trioxide.

After suitable treatment, this was used in the production of hydroxylamine sulphate by the ammonium nitrite method, without producing any drawbacks.

What we claim is:

1. A process for the conversion of ferrous sulphate heptahydrate, obtained as a side product in the manufacture of titanium dioxide from ilmenite via sulphuric acid, to sulphur dioxide of high purity in an aqueous solution of sulphuric acid having a concentration equalling or exceeding 75%, which comprises:
   a. maintaining ferrous sulphate heptahydrate in an evaporator at a temperature exceeding 70°C, for a period of time sufficient to remove, through evaporation, 40 to 60% of the aforementioned sulphate's water of crystallization,
   b. converting, in a dryer, the partially dehydrated ferrous sulphate to its monohydrate form through the employment of hot gases arising from the decomposition step (c), which follows, the temperature of said gases leaving said dryer being maintained within a range of from 320° to 380°C,
   c. decomposing the ferrous sulphate monohydrate in the presence of pyrite and a super heated oxygen-containing gas in an oven in which the temperature is maintained at approximately 800°C, to produce $SO_2$, $SO_3$ and $Fe_2O_3$, said pyrite being present in such an amount that the percentage of sulphur dioxide from the conversion of pyrite with respect to the sulphur dioxide derived, issuing at the end of the scrubbing step (d) which follows, does not exceed 30% by volume, of the total $SO_2$ exiting from the scrubbing, the remainder being derived from the decomposition of ferrous sulphate monohydrate, and
   d. washing away the gases issuing from the oven, in a tower into which an aqueous re-cycled sulphuric acid solution is percolated from the top in a contracurrent with the inlet gas, said sulphuric acid solution being present in a quantity such that the sulphuric acid/solution/inlet gas molar ratio ranges from 5:1 to 2:1 and recovering from the tower sulphur dioxide substantially free from arsenical compounds and sulphur trioxide.

2. The process of claim 1, wherein the temperature employed in Step (a) is 100°C.

3. The process of claim 1, wherein the temperature employed in Step (b) ranges from 340° to 350°C.

4. The process of claim 1, wherein said ratio in Step (d) ranges from 4:1 to 3:1.

* * * * *